(12) United States Patent
Stromberg et al.

(10) Patent No.: US 6,295,979 B1
(45) Date of Patent: Oct. 2, 2001

(54) PEDESTAL MOUNT PERSONAL HEATER

(75) Inventors: Steven R. Stromberg, Marine on St. Croix, MN (US); Brian Sylla, River Falls; Daniel R. Hanson, Beldenville, both of WI (US)

(73) Assignee: All Day Outdoor Products Group Inc., Scandia, MN (US)

( * ) Notice: Subject to any disclaimer, the term of this patent is extended or adjusted under 35 U.S.C. 154(b) by 0 days.

(21) Appl. No.: 09/359,543

(22) Filed: Jul. 22, 1999

(51) Int. Cl.$^7$ ............................................. A47C 7/74
(52) U.S. Cl. ................... 126/208; 248/274.1; 297/180.1
(58) Field of Search ............................ 126/59, 90 R, 126/93, 208; 248/282.1, 284.1, 274.1; 431/344, 353; 297/180.1, 217.1

(56) References Cited

U.S. PATENT DOCUMENTS

| | | |
|---|---|---|
| 49,433 | 8/1865 | Palmer . |
| 51,534 | 12/1865 | Andrews . |
| 196,890 | 11/1877 | Gordon . |
| 208,251 | 9/1878 | Mains . |
| D. 317,042 | 5/1991 | Hall ........................ D23/332 |
| 1,007,461 | 10/1911 | Lehmann . |
| 1,486,756 | 3/1924 | Jaske . |
| 1,987,603 * | 1/1935 | Claesson ................. 126/93 |
| 2,517,254 | 8/1950 | Steele ..................... 126/93 |
| 2,829,635 | 4/1958 | Teller ..................... 126/208 |
| 2,845,924 | 8/1958 | Benda ..................... 126/208 |
| 2,867,206 | 1/1959 | Mendez ................... 126/38 |
| 2,904,031 | 9/1959 | Scott ...................... 126/204 |
| 3,024,782 | 3/1962 | Knopps ................... 126/208 |
| 3,179,156 * | 4/1965 | Weiss ..................... 431/344 |
| 3,513,822 | 5/1970 | Korngold ................. 126/4 |
| 3,590,806 | 7/1971 | Locke ..................... 126/92 |
| 3,689,040 | 9/1972 | Reich ...................... 263/19 |
| 3,738,351 | 6/1973 | Watts ..................... 126/350 |
| 3,744,842 | 7/1973 | Ronning ................. 297/180 |
| 3,846,616 | 11/1974 | Beck ...................... 219/364 |
| 3,975,140 | 8/1976 | Placek .................... 431/329 |
| 4,236,502 | 12/1980 | Kuhl ...................... 126/208 |
| 4,269,591 | 5/1981 | Knoll ..................... 431/312 |
| 4,340,362 | 7/1982 | Chalupsky et al. .......... 432/222 |
| 4,372,198 | 2/1983 | Stover, Jr. et al. .......... 99/340 |
| 4,452,225 | 6/1984 | Plant ..................... 126/92 B |
| 4,475,532 | 10/1984 | Woods .................... 126/204 |
| 4,495,935 | 1/1985 | Lanier .................... 126/204 |
| 4,512,328 | 4/1985 | Arad ..................... 126/37 B |
| 4,633,851 | 1/1987 | Hamilton ................ 126/110 AA |
| 4,676,223 | 6/1987 | Peterson ................. 126/208 |
| 4,774,931 | 10/1988 | Urso ...................... 126/85 |
| 4,860,726 | 8/1989 | Barker ................... 126/208 |
| 4,913,126 | 4/1990 | McCall ................... 126/204 |
| 5,121,739 | 6/1992 | Barker ................... 126/248 |
| 5,405,186 | 4/1995 | Hanson et al. ............. 297/180.1 |
| 5,467,760 | 11/1995 | Cox ....................... 126/208 |
| 5,542,632 * | 8/1996 | Long ..................... 431/344 |
| 5,640,948 | 6/1997 | Nitta et al. ............... 126/262 |
| 5,651,356 | 7/1997 | Kaines ................... 126/59 |
| 5,979,432 * | 11/1999 | Grove .................... 431/344 |

FOREIGN PATENT DOCUMENTS 91101   2/1896   (DE) .

\* cited by examiner

*Primary Examiner*—Sara Clarke
(74) *Attorney, Agent, or Firm*—Kinney & Lange, P.A.

(57) ABSTRACT

A personal warming apparatus includes of a chimney having an open top end, an open bottom end, an inner wall, an outer wall, and an insulating liner. A heating element is disposed within the chimney, and the chimney is suspended in an elevated position from a support system.

9 Claims, 4 Drawing Sheets

PEDESTAL MOUNT PERSONAL HEATER

CROSS-REFERENCE TO RELATED APPLICATION(S)

None.

BACKGROUND OF THE INVENTION

The present invention relates to a heating apparatus, and more particularly pertains to a sportsman's furnace which can be used with or mounted to pre-existing seats.

Sportsmen have always suffered under the elements while participating in various outdoor activities, including hunting and fishing. Many of these activities occur in the fall or winter months when the weather has turned cold. Various devices have been proposed to alleviate this problem. Seat warmers, portable heaters, and various hand and foot warmers have been proposed. The heating devices belong to one of two general styles, reflective heating devices and active heating devices.

A number of disadvantages are associated with these devices. Reflective heating devices do not provide an active source of heat. They rely on heat escaping from a person's body to warm the person. Additionally, these devices only warm the area of the person's body directly in contact with the reflective device. Thus, they are limited as to how quickly they will warm someone and the level of warmth which will be provided to the user. This style of heating device does not provide overall warming to the user because the air which surrounds the person is at ambient temperature. Reflective heating devices are inadequate since uncomfortableness from being cold cannot be remedied by warming only one part of a person's body if the rest of the person's body is cold.

The second main type of heating device, active heating devices, include space heaters and personal heating devices. Space heaters are designed to heat an entire enclosure, not just the individual user. Space heaters require that the person be situated inside an enclosure, otherwise heat is lost to the atmosphere. The result is that a large amount of heat is required from the heater to efficiently warm an individual. Additionally, a large amount of fuel must be carried with the heater to provide adequate warmth to the user, and the large amount of heat produced creates a hazard when operating the heater near combustible materials.

Personal heating devices have been developed which are designed to provide an active heating source and direct the heat so as to warm a person directly, as opposed to warming a spatial area. Some of these devices warm a sitting surface or a particular part of someone's body. Examples of this type of heater are chemical hand and foot warmers. Chemical heating devices operate by providing direct contact between a user's body and a heated surface. A bag or pouch contains chemicals which react to produce heat. The outside of the bag or pouch is placed next to the user's skin to transfer heat generated by the chemical reaction to the user. In these devices, the user's own body may also serve to block or obstruct the flow of heat to the rest of the body. Additionally, direct contact between a person's body and a heated surface requires that the surface be sufficiently insulated or that its temperature be kept sufficiently low so as to avoid discomfort or burning to the user. Chemical heaters typically generate heat for only a short amount of time, due to the limited amount of chemicals which can be contained in the pouch.

Other portable heating devices have been developed which have been designed to provide a seating surface positioned above a heat source and a heated air passageway, which allows the heated air to be directed so as to surround the user. Additional features, such as a coat or poncho have been used to facilitate the directing of the heated air. These portable devices have heating elements inserted into buckets with seats attached to the top of the buckets. Many of these devices provide both cooking and seating surfaces, and as a result, they are not particularly well-suited to the singular purpose of warming a person. Additionally, the portable seat type heater is often too cumbersome or unwieldy to use. The design of the heater is such that it necessarily must be placed on the floor. This limits the flexibility of the heater as to when and where it can be used. The awkwardness of the seat type heater is usually a result of the activity for which it is being used. The activity in which the user is participating may provide a seat that will not allow the efficient use of the portable seat. Many deer hunting stands, fishing boats, spectator sporting events, and other similar activities have seats built into the tree stand, boat, bleacher, etc. which does not permit practical or safe use of a portable heating seat.

BRIEF SUMMARY OF THE INVENTION

The present invention relates to a sportsman's furnace for use in various sporting activities such as deer hunting, fishing, spectator sports, and other outdoor activities. The furnace is an insulated housing with a fuel source attached. A chimney directs the heated air up and around the participant.

A preferred embodiment of the invention allows the furnace to be used in conjunction with a pre-existing seat. The furnace is mounted to the pre-existing seat using a support system. The tube which directs the heat is insulated to prevent burning and reflective on the inside to direct all heat to the user.

DETAILED DESCRIPTION

Figure 1:
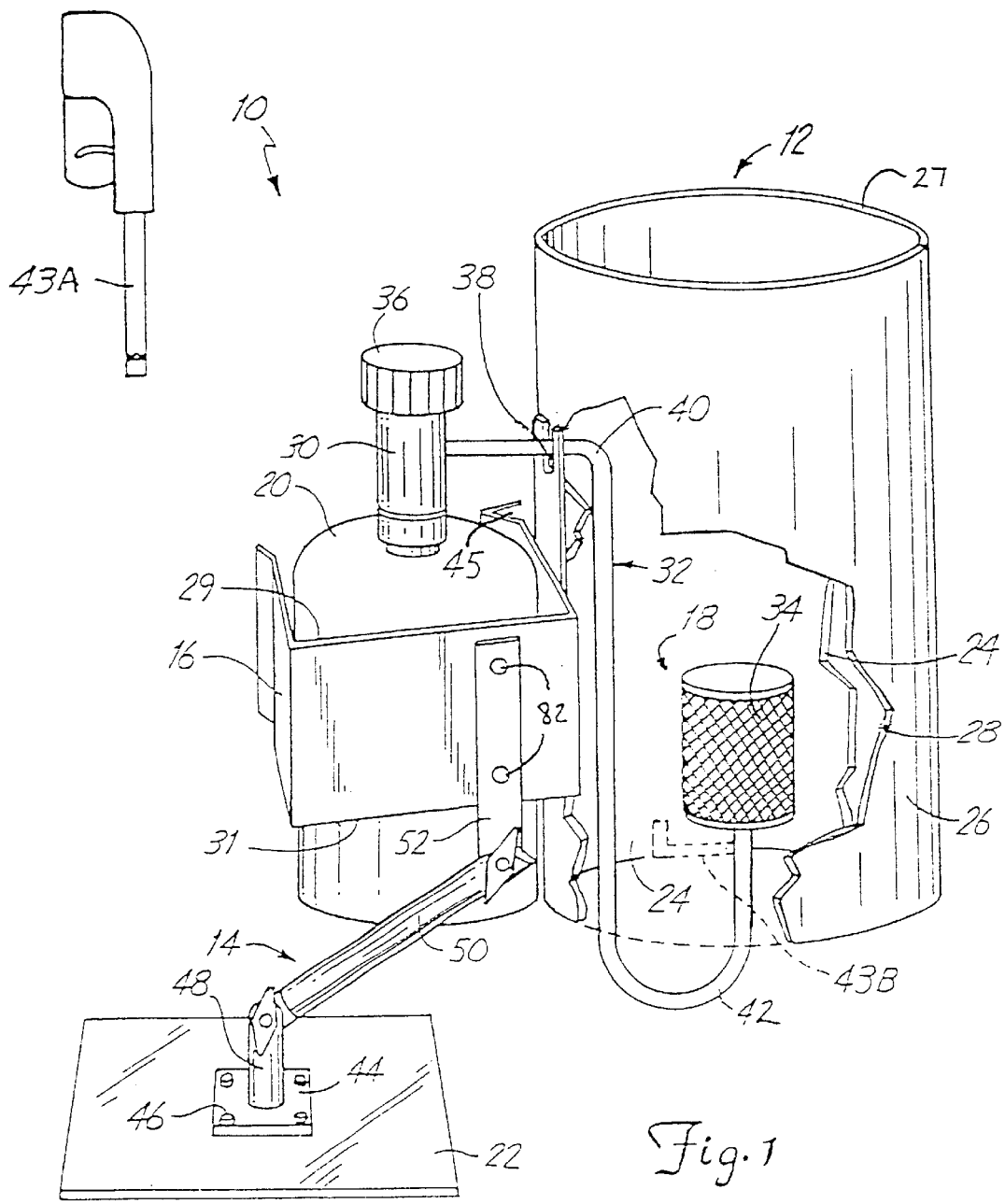
FIG. 1 is a cutaway perspective view of one embodiment of the invention.

The present invention is a sportsman's furnace indicated generally at 10 in FIG. 1. The furnace 10 includes a chimney 12, a linkage 14, a bracket 16, a burner assembly 18, a propane tank 20, and a mounting stand 22.

The chimney 12, includes an inner layer 24, an outer surface layer 26, and a middle layer 28. A top rim 27 defines where the majority of warmed air is exhausted from the chimney 12. The inner layer 24 forms an inner wall of the chimney 12. In the embodiment shown in FIG. 1, the material used for the middle layer 28 is poly vinyl chloride (PVC) tubing. This provides a stable, affordable, strong, lightweight material, which can easily be worked with during the manufacturing of the furnace 10 and is able to maintain its properties at the temperatures required for the invention. Other materials may be used for the chimney 12, including a class B aluminum gas vent. Any material, however, which provides the desired strength, provides the desired insulating capabilities at the required temperatures, and is lightweight so as to be easily transported may be used as the chimney 12.

In this embodiment, inner layer 24 is fiberglass insulation with a reflective covering. This material is known to those skilled in the art, and is commercially available. The inner layer 24 is secured to the middle layer 28 of the insulating chimney 12 by friction fit, but alternatively may utilize an adhesive between the middle layer 28 and the inner layer 24.

The reflective and insulating properties of the inner layer 24 prevent the transferral of heat generated by the burner assembly 18 through the wall of the insulated chimney 12. Very little heat is thermally conducted through the insulated chimney 12. Therefore, the outer surface layer 26 remains at or near the ambient temperature of the surrounding air. In the preferred embodiment, the reflective inner layer 24 extends over the top rim 27 of the chimney 12 insulating the remainder of the chimney 12, (including the outer layer 26) from the warmed air being exhausted.

The optional outer surface layer 26 is a fabric layer secured to the middle layer 28 of the chimney 12. The fabric used for the outer surface layer 26 can have a variety of patterns. Camouflage patterns or blaze orange may be used for the outer layer 26 of the invention if it is to be used in a hunting application. Any style or design of fabric, however, can be provided with the invention to achieve various aesthetic effects including placing company logos or pictures on the fabric. For the inventive embodiment shown in FIG. 1, the outer layer 26 can optionally be excluded from the invention, since the inner layer 24 provides the insulation and reflecting functions. Alternate embodiments may utilize insulation in any of the chimney layers.

The overall length of the chimney is approximately eight to ten inches. The chimney is designed to accommodate a minimum of fifteen inches clearance between the floor and average seat height, while allowing one inch minimum clearance at the floor end. Enough distance is allowed from the top of the chimney 12 to the underside of any seat under which the invention may be positioned to prevent overheating and combustion of the seat material. The diameter of the chimney 12 is approximately six to ten inches. These length and diameter dimensions allow the user to generate and direct enough heated air to warm the user, while maintaining a small enough profile to allow the furnace 10 to be placed below the user without getting in the way of the user's legs. A baffle (not shown) may additionally be mounted above the chimney 12 to further direct heated air.

The chimney 12 design prevents the sides of the chimney 12 from becoming hot and burning the user or igniting any combustible materials that comes in contact with the insulated chimney 12. Heated air emitted from the top of the chimney 12 is allowed enough room to sufficiently cool so as to provide a comfortable level of heat to the user. Additionally, the chimney 12 acts as a guard around the burner assembly 18 to prevent the heat from the burner assembly 18 from coming in contact with any combustible material, while concentrating and directing heated air where the user desires.

By raising the chimney from the ground, and keeping the bottom of the insulated chimney 12 open, the sportsman's furnace 10 maintains a safe environment for use of combustible fuel. For example, if propane is used as the fuel, any unburned propane during the lighting stages or if the flame from the burner assembly 18 is extinguished, will fall through the bottom of the insulated chimney 12 and disperse. This prevents a "fireball" from occurring if the propane is left to run and the user attempts to light the burner assembly 18. Although the preferred embodiment depicts the use of the linkage system 14 to elevate the chimney 12, a person skilled in the art would realize that any number of structures may be used to support the chimney 12 (i.e. a stand to support the propane bottle 20, such as those found commercially available). Additionally, the natural draw from the rising hot air is enhanced by the open ends and elevated position of the insulated chimney 12. Fresh air is drawn from below the chimney 12 and heated air is discharged out the top. This encourages a complete burning of the fuel, and prevents carbon monoxide poisoning, as no sealed combustion chamber exists.

The use of an open chimney 12 (both top and bottom) simplifies the design and results in less manufacturing costs than a furnace which requires a base and cover. By concentrating and directing the heated air, the chimney 12 cuts down in the amount of heat that must be generated, which reduces the noise produced by the furnace 10 and the possibility that the heated air could ignite nearby flammable materials. Noise is a primary concern when the furnace 10 is used in hunting applications. Although eight to ten inches length and six to ten inches diameter is the preferred embodiment of the chimney 12, alternate embodiments may utilize different length and diameter dimensions and still remain within the scope of the invention. Additionally, although FIG. 1 shows the chimney 12 formed in a tube with a circular cross-section, any shape is acceptable including square, rectangular, or hexagonal.

The insulating chimney 12 is mounted to a bracket 16 typically using bolts and nuts. The bracket 16 in the preferred embodiment is manufactured from a light-weight metal such as aluminum. However, any rigid material which is strong enough to support the weight of the chimney 12, burner assembly 18 and propane tank 20, may be used. This may include a rigid plastic, steel, or other like material. The bracket includes an upper edge 29 and a lower edge 31. The bracket 16 is formed so as to accept the propane tank 20. The propane tank 20 used in the embodiment shown in FIG. 1, is a pressurized tank holding approximately one pound of fuel and is disposed in a longitudinal fashion parallel to the outer layer 26 of the chimney 12. The tank 20 is available commercially at many sporting goods stores. Although the embodiment of the invention shown in FIG. 1 shows the propane tank 20 as a one pound tank, a person skilled in the art will realize the bracket 16 may be designed to accommodate various tank sizes or shapes.

The bracket 16 is disposed proximate to where the burning assembly 18 enters into the chimney 12. The burning assembly 18 includes a valve 30, a feed tube 32, and a burner 34. The valve 30 mounts to the outlet of the propane tank 20. The valve 30 includes an adjusting knob 36 which allows the user to vary the amount of fuel which runs through the burner assembly 18, thereby adjusting the amount of heat produced by the furnace 10. The valve 30 is commercially available and of the type which fits on the one pound propane fuel tank 20. In the preferred embodiment, a direct pressure valve is used which allows for adjustment of the fuel at low flow levels.

The feed tube 32 extends horizontally from the valve 30 through an aperture 38 in the insulated chimney 12. The feed tube then extends through a first curve 40 and then downwardly, proximate and substantially parallel to the inner wall of the chimney 12. Once the tube reaches below the bottom of the insulating chimney 12 approximately one and one quarter inches, it extends through a second curve 42, directing the feed tube 32 upwardly and substantially parallel to the inner wall of insulating chimney 12. Directing the feed tube 32 below the chimney 12 has the desirable effect of maintaining a set amount of space between the floor and the bottom of the chimney 12. The feed tube is typically brass (although a person skilled in the art will realize that alternate materials may be used). Although the preferred embodiment extends the feed tube 32 through the chimney 12 before extending through the first curve 40, an alternate embodiment of the invention can exist. For example, the tube may be disposed parallel to the outside of the chimney 12 before extending through the second curve 42 up into the chimney 12.

The burner 34 is mounted to the upwardly extending feed tube 32, typically by threading the burner 34 onto the feed tube 32. The burner 34 is a low flow type, is known in the art, and is commercially available. Using a low flow burner 34 limits the amount of heat which is generated, allowing the heater to be fine tuned by the valve 30. The low flow, low BTU (British Thermal Unit) burner 34 also produces very little noise, an advantage in hunting applications. The low heat production also serves to prevent combustion of any ignitable materials which are in the proximity of the furnace 10, providing an additional factor of safety to the heater 10. The upper limit of the average operating temperature is approximately 150 degrees Fahrenheit. The burner 34 is mounted so as to be disposed approximately along the axis of the chimney 12 approximately two to four inches from the bottom of the chimney 12. Placement of the burner 34 in this location directs a small portion of the heat downward out the bottom of the chimney 12, allowing the user to warm his or her feet under the chimney 12.

To operate the furnace 10, the user turns on the valve 30 allowing propane to flow through the feed tube 32 to the burner 34. The propane which is issuing through the burner 34 is ignited typically using a piezoelectric device 43A although a person skilled in the art would realize any device which issues a flame or a spark may be used to ignite the burner 34. The piezoelectric device 43A is a separate attachment which is placed in a holding slot 45 in the bracket 16. Alternatively, an integral piezoelectric device 43B (shown in dotted lines) may be provided as part of the invention. After the burner 34 has been ignited, the user may adjust the amount of heat generated by the furnace 10 by adjusting the valve 30 controlling the amount of fuel sent to the burner 34.

The linkage 14 maintains the chimney in an elevated position, and is mounted to the bracket 16 typically using bolts and nuts. Wing nuts (not shown) may be used to allow convenient attachment and unattachment of the linkage 14 to the bracket 16. Mounting the linkage 14 to the bracket 16 in this manner balances the weight of the tank 20 with the weight of the chimney 12. In the embodiment shown in FIG. 1, the linkage system 14 (further discussed with respect to FIG. 2) terminates and is mounted to a mounting stand 22. The mounting stand 22 (or floor plate), includes a flat base, rectangular in shape, measuring approximately 11 ¾ inches along one dimension by approximately 11 ⅛ inches in the second dimension. Although the preferred embodiment uses the above dimensions, any size plate which provides enough stability for the sportsman's furnace 10 to prevent the weight of the insulated chimney 12, bracket 16, burner assembly 18, propane tank 20, and linkage system 14 from tipping over the sportsman's furnace 10 may be used. In the preferred embodiment, the mounting stand 22 is manufactured from a hard plastic, however any rigid material with adequate strength may be used, including wood, metal, or composite materials. The mounting stand 22 also includes a flat mounting bracket 44 mounted to the mounting stand 22 typically using screws 46.

Figures 2, 2A:
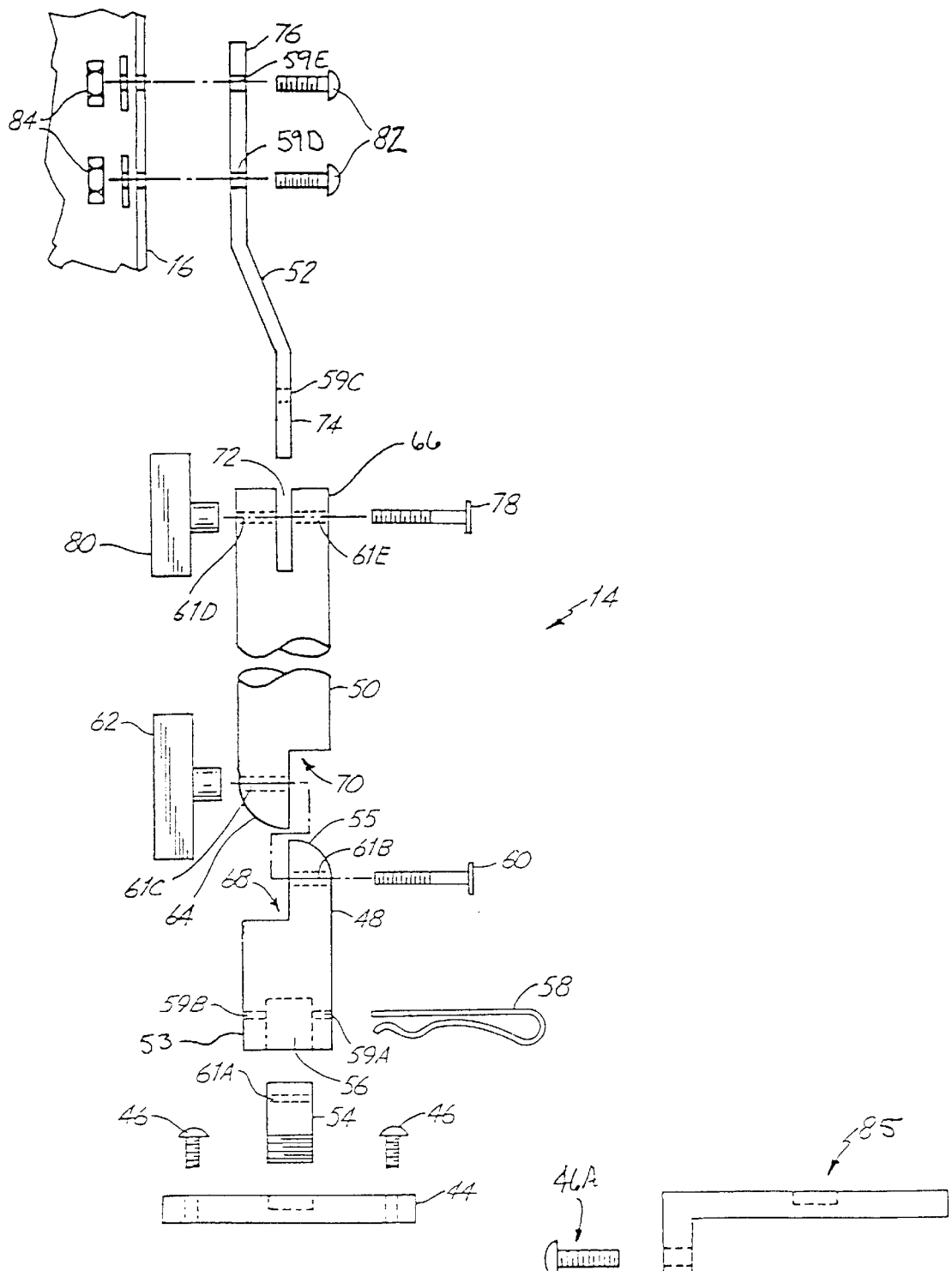
FIG. 2 is an exploded view of one embodiment of the linkage system.
FIG. 2A is a side view of an alternate embodiment mounting bracket.

The preferred embodiment of the linkage system 14 is shown in FIG. 2. The linkage system 14 is comprised of a base link 48, a middle link 50 and a bracket link 52. The base link 48 has a lower end 53 and an upper end 55. The lower end 53 is disposed proximate to the flat mounting bracket 44. The flat mounting bracket 44 is coupled to the lower end 53 of the base link 48 by a coupling pin 54. The coupling pin 54 is threaded into the flat mounting bracket 44. The base link 48 is disposed on the coupling pin 54 so that the coupling pin 54 extends into a cavity 56 in the base link 48. A cotter pin 58 is extended through a first aperture 59A in the base link 48, further through a bore 61A in the coupling pin 54 and finally through a second aperture 59B in the base link 48 so that the cotter pin 58 effectively locks the coupling pin 54 inside the base link 48. By connecting the flat mounting bracket 44 to the base link 48 in this fashion, the base link 48 is able to rotate about its central axis. Rotation is allowed by partial threading and unthreading the coupling pin 54 with respect to the flat mounting bracket 44.

The upper end 55 of the base link 48 is connected to the middle link 50 using a first hinge pin 60 and a first nut handle 62. The middle link 50 contains a base end 64 and a bracket end 66. Bores 61B and 61C run through the upper end 55 of the base link 48, and the base end 64 of the middle link 50. The upper end 55 of the base link 48 additionally contains a first notch 68. The first notch 68 extends from the upper end 55 of the base link 48 approximately ¾ of an inch towards the lower end 53 of the base link 48. The upper end 55 of the base link 48 is rounded in shape. This rounded shape allows for the pivoting motion of the base link 48 with respect to the middle link 50. The base end 64 of the middle link 50 is designed to be the same shape as the upper end 55 of the base link 48. The base end 64 contains a second notch 70 and the base end 64 is rounded in shape. The first notch 68 on the base link 48 is mated with the second notch 70 on the middle link 50. The first hinge pin 60 is extended through the bore 61B in the base link 48 and then further through the bore 61C in the middle link 50. The first nut handle 62 is threaded onto the first hinge pin 60. By tightening or loosening the first nut handle 62 on the first hinge pin 60, the user is able to alternatively lock or unlock the position of the middle link 50 with respect to the base link 48.

Bores 61D and 61E extends through the bracket end 66 of the middle link 50. A slot 72 extends from the bracket end 66 of the middle link 50 towards the base end 64. The slot 72 extends for approximately one inch. The bracket link 52 includes a linkage end 74 and a heater end 76. Aperture 59C extends through the linkage end 74. The linkage end 74 of the bracket link 52 is extended into the slot 72 of the bracket end 66. A second hinge pin 78 extends through the bore 61E in the bracket end 66 of the middle link 50, continues through the aperture 59C in the linkage end 74 of the bracket link 52 and finally further through the second bore 61D in the bracket end 66 of the middle link 50, pivotally connecting the bracket link 52 to the middle link 50. A second nut handle 80 is threaded onto the second hinge pin 78, allowing the user to alternately tighten or loosen the hingeable connection between the bracket link 52 and the middle link 50, locking or unlocking the position of the bracket link 52 with respect to the middle link 50.

Apertures 59D and 59E are disposed through the bracket link 52 proximate to the heater end 76. Bolts 82 are extended through the apertures 59D and 59E further through bracket 16, and secured with nuts 84. The bracket link 52 is thereby fixably attached to the bracket 16. The bracket link 52 has a bend formed in the middle of the link 52. The link 52 is shaped so that the portion of the link 52 which extends from the heater end 76 of the link 52 is parallel to the portion of the link 52 which extends from the linkage end 74 of the link 52. Thus, the bracket link 52 does not extend in an unbroken linear fashion. The angled shape of the bracket link 52 extends the bracket 16 and the propane tank 20 further from the main linkage system 14 assembly. Thus, when the user rotates the bracket link 52 with respect to the middle link 50 about the second hinge pin 78, the propane tank 20 will not interfere with the freedom of motion of the links 48, 50, 52.

Using the three link system 14 enables the user to rotate the sportsman's furnace 10 about the coupling pin 54 as well as change the angle of the bracket 16, propane tank 20, and chimney 12 with respect to the flat mounting bracket 44. The user can extend the insulated chimney 12 horizontally away from the flat mounting bracket 44 while maintaining the chimney 12 in a vertical position, by rotating the links 48, 50, 52 about their respect hinge pins 60 and 78. The chimney 12 portion of the sportsman's furnace 10 "floats" where the user wishes the heat to be provided, while not requiring an unwieldy and cumbersome support structure that takes up a large amount of space. The furnace can quickly be pivoted away from the user to avoid interfering with the user's legs. The length of the linkage system 14 can be varied by altering the lengths of the base link 48, middle link 50, and bracket link 52. In the preferred embodiment, the base link 48 is approximately 2 ¼ inches, the middle link 50 is approximately 5 ¾ inches, and the bracket link 52 is approximately 5 inches long, although a person skilled in the art would recognize that variety of link sizes may be used for the inventive furnace 10.

The embodiment shown in FIG. 2 illustrates the linkage system 14 projecting upwardly with the flat mounting bracket 44 positioned below the links 48, 50, and 52. The bracket link 52 portion of the linkage system 14 is extended upwardly onto the bracket 16 before mounting. An alternate embodiment would allow the mounting bracket 44 to be mounted on a lower surface of a seat, a ceiling or other elevated object, with the links 48, 50, and 52 extending below the flat mounting bracket 44 (this embodiment is discussed further with respect to FIG. 4).

The use of the cotter pin 58 and the coupling pin 54 (shown in FIG. 2) allows the user to easily disconnect the sportsman's furnace 10 from any bracket or mounting point. After disconnecting the furnace 10, it is easily transportable from application to application and is small enough to fit inside a standard backpack (not shown). The chimney 12, bracket 16, burner 18 and tank 20 portion of the furnace 10 may also be separated from the linkage system 14 and supported from the floor using a fixed position stand or hung from a chain, rope, or other similar hanging device.

An angle bracket 85, as displayed in FIG. 2A, may be used instead of the flat mounting bracket 44 shown in FIG. 2. The angle bracket 85 is an L shaped bracket, and is connected to the linkage system 14 using the same method described with respect to the flat mounting bracket 44. The angle bracket 85 has the effect of allowing the sportsman's furnace 10 to be mounted on the edge of a platform, or any other applications where a flat mounting bracket 44 would not be mountable. The angle bracket 85 is typically mounted using screws or bolts 46A.

Figure 3:
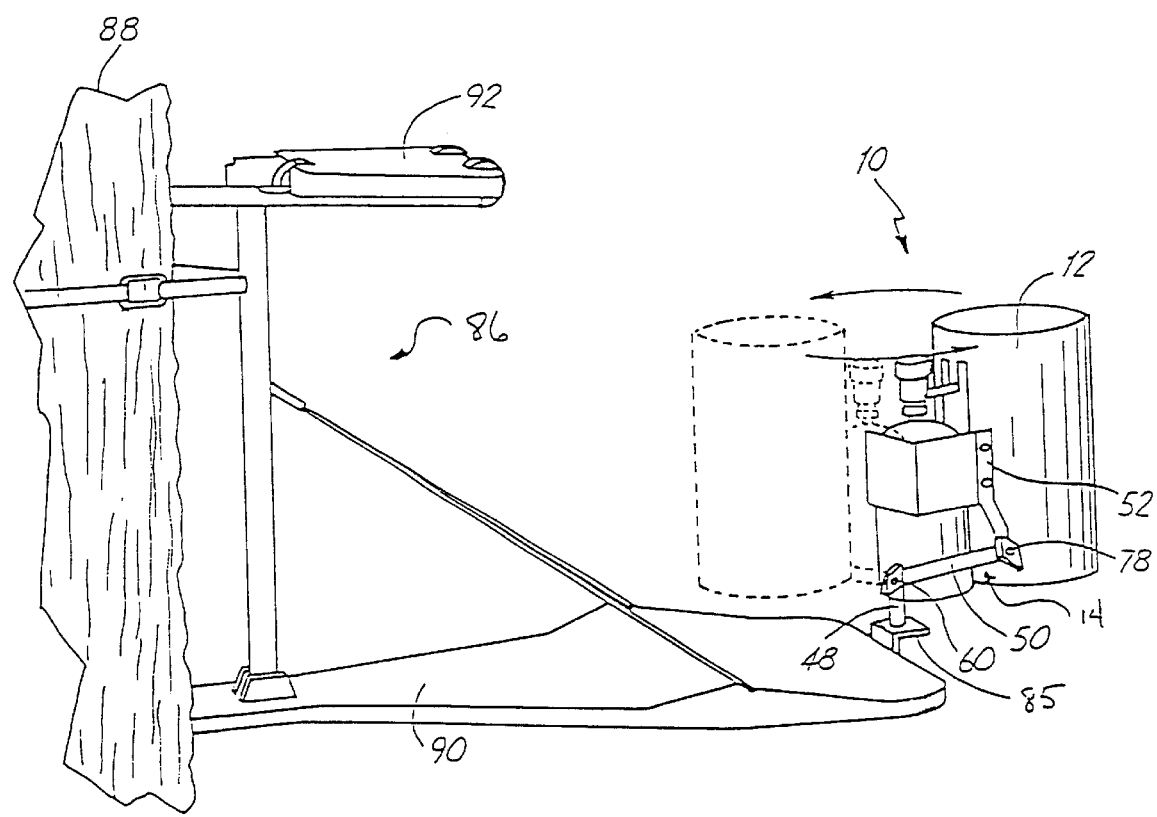
FIG. 3 is a perspective view of one embodiment of the inventive furnace mounted to a tree stand.

An example of a platform mounted sportsman's furnace 10 mounted using the angle bracket 85 is illustrated in FIG. 3. The sportsman's furnace 10 is mounted to a tree stand 86 which in turn is mounted to a tree 88. The tree stand 86 includes a platform 90 and a seat 92. The sportsman's furnace 10 is mounted to the tree stand 86 by connecting the angle bracket 85 described with respect to FIG. 2A to the platform 90. This mounting method is particularly useful when the platform 90 is not a solid piece of material, but instead is comprised of a grid type platform or other non-solid surface. As illustrated in FIG. 3, the linkage system 14 allows the sportsman's furnace 10 to be swung from a position distal from the seat 92 of the tree stand 86 to a position where the sportsman's furnace 10 is proximate to the seat 92. The base link 48 turns within the angle bracket 85 to rotate the sportsman's furnace 10 in a horizontal direction. The middle link 50 is rotated about the first hinge pin 60 to adjust the vertical height versus the horizontal projection of the insulated chimney 12. The bracket link 52 is adjusted with respect to the middle link 50 by rotating it about the second hinge pin 78 to maintain the insulated chimney 12 in a position perpendicular to the platform 90.

By using the sportsman's furnace 10 in this fashion, the user of the tree stand can swing the sportsman's furnace 10 into the position proximate to the seat 92 when the user wishes to use the heater to provide warmed air. Alternatively, the user may swing the sportsman's furnace 10 to a position distal from the seat 92 when the user needs to stand or move about on the platform 90.

Figure 4:
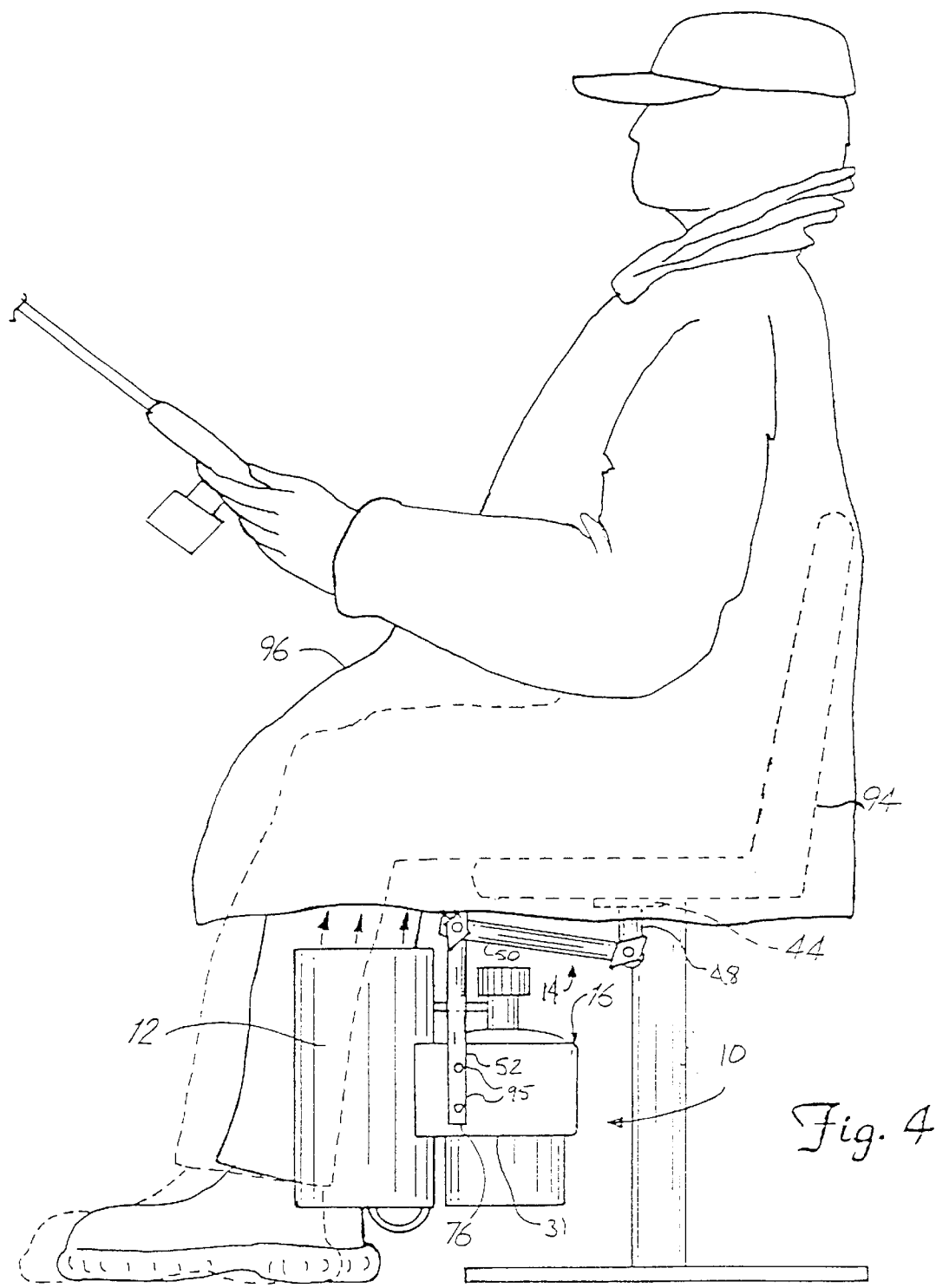
FIG. 4 is a side view of one embodiment of the inventive furnace mounted to a pre-existing pedestal seat.

An alternate mounting method is illustrated in FIG. 4. A pedestal seat 94 of the type which may be found in a fishing boat, is used to mount the sportsman's furnace 10. The flat mounting bracket 44 is mounted to the underside of the pedestal seat 94. The linkage system 14 extends downwardly from the pedestal seat 94. Mounting the linkage system 14 extending in a downwardly fashion still allows the insulated chimney 12 and the remainder of the sportsman's furnace 10 to be mounted in an upright vertical position. This is accomplished by extending the bracket link 52 downwardly onto the bracket 16, placing the heater end 76 of the bracket link 52 proximate to the lower edge 31 of the bracket 16, before fixing the bracket link 52 to the bracket 16, using nuts and bolts 95.

Placing the sportsman's furnace 10 under the pedestal seat 94 in this fashion allows the user to swing the insulated chimney 12 so that it is positioned to provide heat directly underneath the user or alternatively, swing the chimney 12 away from the user. Swinging the chimney 12 away from the user's legs when the furnace 10 is not in use prevents the furnace 10 from interfering with the user's legs when he or she wishes to stand up or move about. Since the furnace 10 is mounted to the seat 94, when the seat 94 is rotated, the furnace 10 rotates with the seat 94 and continues to provide heated air to the user.

The user may also wear a tent poncho 96, which has the effect of trapping and directing heated air emitted from the sportsman's furnace 10 around the user's body. The embodiment of the tent poncho 96 shown in FIG. 4 can optionally provide a split opening (not shown) in the center back side. A magnetic closure (not shown) is used in order to secure the split opening while still allowing the poncho to hang down around both sides of the seat on the backside of the user. The magnetic closure allows more efficient trapping of heat under the garment and also will pull open with little resistance as the user stands up. The magnetic closure makes little or no sound when opened, a factor of great importance when used in deer hunting activities. Hook and loop style closures would be an alternate attachment method for the poncho used in other applications, including the pedestal seat used in fishing boats (see FIG. 4), or sporting events. Although the split opening can be used, a user skilled in the art will realize that it is not necessary for the poncho 96 to direct warmed air around the user.

Although three methods of mounting the inventive furnace 10 have been described, a person skilled in the art would realize that the furnace 10 may be mounted in a variety of environments. Additionally, any number of mounting points may be used. All variety of mounting methods gives the sportsman's furnace 10 great flexibility.

Utilizing the tent poncho 96 when operating the sportsman's furnace 10 allows the user to keep fresh air fed to the furnace 10 at all times. For example if the furnace 10 is used in an ice fishing shanty, the windows and door can be kept open to maintain a fresh supply of air at all times. This is imperative when using combustible fuels to avoid carbon monoxide poisoning. The fresh air supply prevents incomplete burning or re-burning of oxygen depleted air both of which create carbon monoxide during the combustion of petroleum based products. In addition, use of the tent poncho 96 allows efficient trapping of the low heat output by the low BTU burner 34 while the user's face is exposed to fresh air. The overall concept of a low BTU output sportsman's furnace 10 combined with the tent poncho 96 shelter allows efficient use of a mechanical heat source outside of an enclosed area, thus eliminating risk of carbon monoxide poisoning. Even without the poncho 96, however, the use of the low BTU burner 34 and the open bottom of the chimney 12 prevents carbon monoxide buildup by allowing enough oxygen to be supplied to the burner 34.

Although the present invention has been described with reference to preferred embodiments, workers skilled in the art will recognize that changes may be made in form and detail without departing from the spirit and scope of the invention.

What is claimed is:

1. A personal warming apparatus comprising:
   a chimney, having an open top end, an open bottom end, and a sidewall having a heat insulating layer comprised of fiberglass insulation with a reflective covering;
   a support system mounted to the chimney so that the chimney is suspended in an elevated position by the support system; and
   a heating element disposed within the chimney.

2. A personal warming apparatus comprising:
   a chimney, having an open top end, an open bottom end, and a sidewall having a heat insulating layer;
   a support system mounted to the chimney so that the chimney is suspended in an elevated position by the support system, the support system further comprising a bracket mounted to the chimney, a floor plate, and a support link mounted between the bracket and the floor plate; and
   a heating element disposed within the chimney.

3. A personal warming apparatus comprising:
   a chimney, having an open top end, an open bottom end, and a sidewall having a heat insulating layer wherein the chimney is approximately eight to ten inches in length and approximately six to ten inches in diameter;
   a support system mounted to the chimney so that the chimney is suspended in an elevated position by the support system; and
   a heating element disposed within the chimney.

4. A personal warming apparatus comprising:
   a chimney having an interior and an exterior, an open top end, an open bottom end and a heat insulating material comprised of fiberglass with a reflective covering;
   a heating element disposed within the chimney,
   a bracket mounted to the exterior of the chimney,
   a support system mounted to the bracket; and
   a fuel tank disposed within the bracket and connected by tubing to the heating element.

5. The apparatus of claim 4 wherein the support system is mounted to a pedestal seat.

6. The apparatus of claim 4 wherein the support system is mounted to a tree stand.

7. A personal warming apparatus comprising:
   a chimney having an interior and an exterior, an open top end, an open bottom end and a heat insulating material;
   a heating element disposed within the chimney;
   a bracket mounted to the exterior of the chimney;
   a support system mounted to the bracket;
   a fuel tank disposed within the bracket and connected by tubing to the heating element; and
   a poncho configured to be worn by a user so as to direct heat emitted by the chimney to the user.

8. A personal warming apparatus comprising:
   a chimney having an interior and an exterior, an open top end, an open bottom end and a heat insulating material;
   a heating element disposed within the chimney;
   a bracket mounted to the exterior of the chimney;
   a support system mounted to the bracket;
   a fuel tank disposed within the bracket and connected by tubing to the heating element; and
   a fabric covering disposed over the exterior of the chimney.

9. A personal warming apparatus comprising:
   a chimney having an interior and an exterior, an open top end, an open bottom end and a heat insulating material, wherein the chimney is approximately eight to ten inches in length and approximately six to ten inches in diameter;
   a heating element disposed within the chimney;
   a bracket mounted to the exterior of the chimney;
   a support system mounted to the bracket; and
   a fuel tank disposed within the bracket and connected by tubing to the heating element.

* * * * *